Patented Sept. 3, 1935

2,013,152

UNITED STATES PATENT OFFICE 2,013,152

MOTOR FUEL

William D. Hoyt, Lexington, Va.

No Drawing. Application August 22, 1932,
Serial No. 629,879

16 Claims. (Cl. 44—9)

This application is filed as a continuation in part of my application, Serial No. 48,884 filed Aug. 7, 1925. My present invention relates to an improved motor fuel.

The principal object of the invention is to provide a fuel which is inexpensive and more efficient than gasoline, the materials of which are non-toxic, and which are not injurious to man when employed in the mixture.

A further object of my invention is to reduce or avoid the deposit of carbon within the cylinder of the combustion engine resulting from the use of gasoline as a fuel. I am aware that heretofore many motor fuels have been devised as substitutes for gasoline. These fuels are largely combinations of various hydro-carbons of different boiling points. An efficient fuel has heretofore been made comprising a mixture of gasoline, kerosene, and lead in colloidal solution, which has been found to be more economical and of greater efficiency than gasoline. Such a mixture, however, because of the toxicity of the lead content is necessarily dangerous to life and is therefore unsuitable for general use as a motor fuel.

I have discovered by experiment that the colloidal solution of tin is non-toxic, and it has been found that this metal is a suitable ingredient of a motor fuel. I have also discovered that the toxicity of a colloidal solution of aluminum which is similarly suitable as an ingredient of fuel, is so slight as to make its use therein entirely practical and safe.

When in this specification or claims a metal is referred to as non-toxic, it is intended to include metals whose toxicity is so slight as not to appreciably endanger human life. Zinc is an example of non-toxic metal as defined herein. While slightly toxic to delicate cultures, it is not injurious to man. Nickel is another example of a metal non-toxic to man that may be used.

In carrying out my invention I mix together gasoline and kerosene, or other combustible hydro-carbons, and to this mixture I add a small portion of a non-toxic metal in colloidal solution. In the case of tin, from one to five grams per gallon, and in the case of aluminum, a slightly less amount by weight is used.

An economical and efficient fuel is made by mixing one part by volume of gasoline with three parts by volume of kerosene. To each gallon of this mixture, tin in colloidal solution is added to the extent of from one to two grams.

The proportion of kerosene and gasoline may be varied within wide limits, dependent upon the flashing point desired in the mixture, or other combustible hydro-carbons may be substituted, similarly dependent upon the flashing point desired. Also other non-toxic metals (as for example aluminum, zinc, or nickel) in colloidal solution may be substituted for the tin without departing from the spirit of my invention. Also, I may use a mixture of a single hydro-carbon such as kerosene, with the non-toxic colloidal metallic solution.

In the cases where I have used zinc, I have used from .04 to .4 gram and more of zinc per quart of kerosene in the mixture. Good results have been obtained with .25 gm. zinc per quart of kerosene. I have used a mixture of two-thirds gasoline to one-third kerosene, also a half gasoline and half kerosene mixture, and also a mixture of one-third gasoline to two-thirds kerosene. From this it will be observed that there may be varying quantities of zinc in the fuel, as in the case of aluminum and tin. A good proportion has been found to be substantially .25 gram per quart of kerosene used in the mixture. In the use of nickel substantially the same quantities may be used as with zinc.

It is believed that the colloidal metals contained in the mixtures of my invention act as catalysts, and promote the more complete combustion of the hydro-carbons of the mixture, thus reducing the deposit of carbon, and increasing the efficiency of the fuel. The catalytic action renders the combustion more complete and gives greater energy efficiency to the fuel.

Fuels, which I have prepared in accordance with my invention, have stood for considerable periods of time with the metals in suspension. It will be understood that the fuel may be prepared in quantities and distributed for use, without having to stand for any considerable length of time. If, however, fuel is to remain in storage undisturbed for long periods, it may be desirable to stabilize it so as to circumvent any tendency that the colloidal metal may have to settle or to accumulate in the depths of the fuel. To thus stabilize the fuel, I have used a number of agents such as gums, resins, oleo-resins, balsams, and higher aliphatic acids, both saturated, and unsaturated, together with their salts and mixtures of the same. Amounts used have varied from .05 to .3 gram per quart of the kerosene colloid mixture. Good results have been obtained with respectively .2 gram zinc resinate, .1 gram burgundy pitch, .05 gram stearic acid, and .01 to .03 cc. oleic acid per quart of kerosene used. In the case of colloidal zinc, I have obtained good results with .1 gram resin, and .3 gram zinc to one quart of kerosene used in the fuel.

The fuel may be prepared in different ways, but good results may be obtained by proceeding in the following manner, namely,—

Take one of the hydro-carbons, for instance, kerosene, add to this the substance to be used to stabilize the fuel, and then introduce into the kerosene two rods of the metal to be used in the mixture, each of which is connected to one side of an electric circuit in which there is introduced a lamp bank or other resistance to regulate the amount of current. The rods should be immersed so that their free ends are near the bottom of the container of the hydro-carbon so as to avoid danger of combustion. The rods may be suitably supported, for instance, one of them may be held by a fixed stand, the other by a stand capable of being moved for adjusting the rod supported by it. The current may be then turned on and the free ends of the rods brought near together until a spark is obtained between them. The distance between their ends should be regulated and adjusted so that the sparking continues. An alternating current of sixty cycles, and from .5 to two amperes and 110 to 1000 volts, has been successfully employed. Satisfactory results have been obtained when using 110 volts, and about 1 ampere. Under these conditions the metal is broken from the rod and set free in the hydro-carbon in the form of a dense cloud which finally permeates the whole mass within the container. The metal comes off in such infinitely small particles as to be in colloidal form, and to remain in suspension for considerable periods of time, even without the use of the stabilizing substance.

When the desired amount of the metal has been deposited in the hydro-carbon medium in colloidal form, the current may be turned off, and the rods withdrawn, and the hydro-carbon mixed with the other hydro-carbon contents of the fuel, if a mixture of them is to be used.

It will be understood that the frequency, amperage, and voltage of the current used may be modified in accordance with the circumstances under which the work is being carried out, the above illustrations being given for purposes of understanding of the invention.

The foregoing description has been given for clearness of understanding and no undue limitation should be deduced therefrom, but the appended claims should be construed as broadly as possible, in view of the prior art. I attribute the action of the stabilizing materials to the formation of free ions when the materials are dissolved in the hydro-carbon, the ions acting to hold the colloidal metals in suspension against any tendency they might otherwise possibly have to settle if the fuel is allowed to stand undisturbed for long periods of time.

Having thus described my invention what I claim as new, and desire to secure by U. S. Letters Patent is:—

1. A fuel containing one or more hydro-carbons and a colloidal solution of tin.

2. A fuel containing gasoline, kerosene and a colloidal solution of tin.

3. A fuel containing substantially three parts by volume of kerosene, one part of gasoline, and from one to two grams per gallon of tin in colloidal solution.

4. A fuel containing gasoline, kerosene, and a colloidal solution of aluminum.

5. A fuel for internal combustion engines comprising a mixture of gasoline and kerosene to which has been added a metal in colloidal solution selected from the group consisting of tin, aluminum and zinc.

6. A fuel comprising kerosene, gasoline, and containing a colloidal metal selected from the group consisting of tin, aluminum and zinc.

7. A fuel containing gasoline, kerosene, and a colloidal solution of zinc.

8. A fuel comprising a mixture of gasoline and kerosene to which has been added a small proportion of a non-toxic metal in colloidal condition selected from the group consisting of tin, aluminum, and zinc.

9. A fuel comprising substantially three parts by volume of kerosene, substantially one part by volume of gasoline, and from one to two grams per gallon, of a metal in colloidal solution selected from the group consisting of aluminum, tin, and zinc.

10. A fuel comprising substantially three parts by volume of kerosene, one part by volume of gasoline, and from one to five grams per gallon of a metal in colloidal condition which is non-toxic and non-injurious to man and selected from a group consisting of tin, aluminum and zinc.

11. A fuel containing one or more hydro-carbons, and a colloidal solution of a metal which is non-toxic and non-injurious to man when so employed and selected from the group consisting of tin, aluminum and zinc.

12. A fuel containing one or more hydro-carbons, a colloidal solution of a metal which is non-toxic and non-injurious to man selected from the group consisting of tin, aluminum and zinc, and a stabilizing medium capable of releasing free ions when dissolved in the hydro-carbon.

13. A fuel containing one or more hydro-carbons, a colloidal solution of a metal which is non-toxic and non-injurious to man selected from the group consisting of tin, aluminum and zinc, and a stabilizing medium comprising a resinate.

14. A fuel containing one or more hydro-carbons, a colloidal solution of a metal which is non-toxic and non-injurious to man selected from the group consisting of tin, aluminum and zinc, and a stabilizing medium comprising a gum.

15. A fuel containing one or more hydro-carbons, a colloidal solution of a metal which is non-toxic and non-injurious to man selected from the group consisting of tin, aluminum and zinc, and a stabilizing medium comprising a resin.

16. A fuel containing on or more hydro-carbons, a colloidal solution of a metal which is non-toxic and non-injurious to man selected from the group consisting of tin, aluminum and zinc, and a stabilizing medium comprising a fatty acid.

WILLIAM D. HOYT.